United States Patent

[11] 3,568,626

| [72] | Inventor | Hamilton Southworth, Jr.<br>New York, N.Y. |
|---|---|---|
| [21] | Appl. No. | 681,355 |
| [22] | Filed | Nov. 8, 1967 |
| [45] | Patented | Mar. 9, 1971 |
| [73] | Assignee | Bell Telephone Laboratories, Incorporated<br>Murray Hill, N.J. |

[54] IDENTIFYING MEANS FOR BURIED UTILITIES
3 Claims, 10 Drawing Figs.

[52] U.S. Cl. ............................................. 116/114,
    61/72.1
[51] Int. Cl. ............................................. G01d 21/00
[50] Field of Search ............................................. 116/124;
    161/57, 101, 97, 70, 103, 84, 86, 123, 99, 127,
    149, 129, 161; 156/292; 53/(Inquired);
    18/(Inquired); 8/4; 264/(Inquired); 116/114 (UX Digest)

[56] References Cited
UNITED STATES PATENTS

| 2,994,958 | 8/1961 | Beeber | 33/137 |
|---|---|---|---|
| 3,233,870 | 2/1966 | Gerhardt | 161/143X |
| 2,545,981 | 3/1951 | Warp | 161/57 |
| 2,772,993 | 12/1956 | Magnuson | 161/84 |
| 3,115,861 | 12/1963 | Allen | 116/114 |
| 3,282,057 | 11/1966 | Prosser | 61/72.1 |
| 2,854,840 | 10/1958 | Anderson | 116/114UX |

FOREIGN PATENTS

| 410,900 | 5/1934 | Great Britain | 116/114 |
|---|---|---|---|

Primary Examiner—Louis R. Prince
Assistant Examiner—Daniel M. Yasich
Attorneys—R. J. Guenther and Edwin B. Cave ABSTRACT: Excavators are warned of the proximity of buried cables or other buried utilities by burying above the utilities lengths of extensible and stretchable nonfrangible wires or tapes located to be moved by excavating instruments and marked to indicate the existence of the utilities. Preferably, the wires or tapes include magnetic or radioactive portions which can be sensed above ground prior to excavation to locate and identify utilities.

PATENTED MAR 9 1971
3,568,626
SHEET 1 OF 2
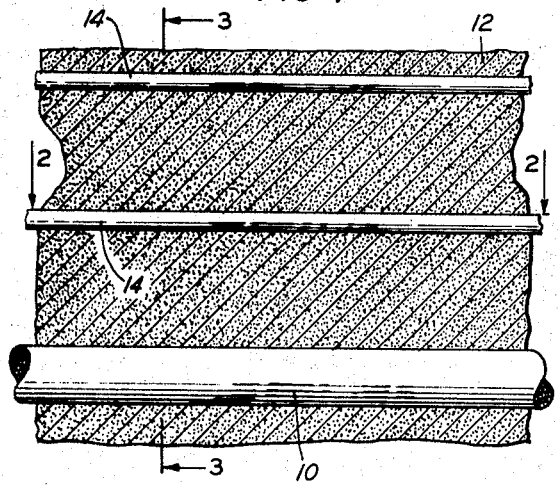
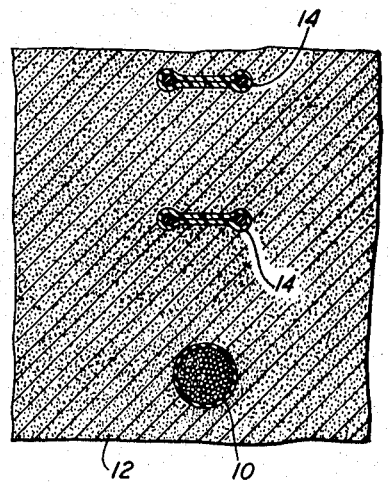
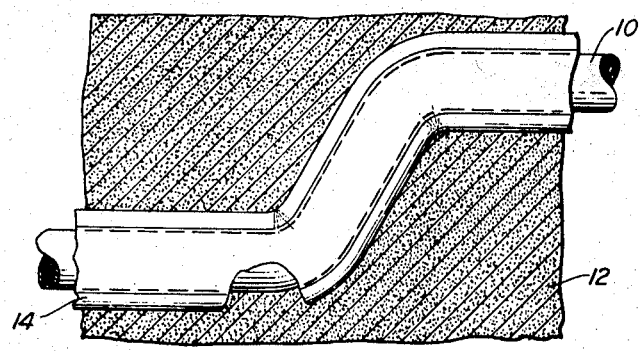
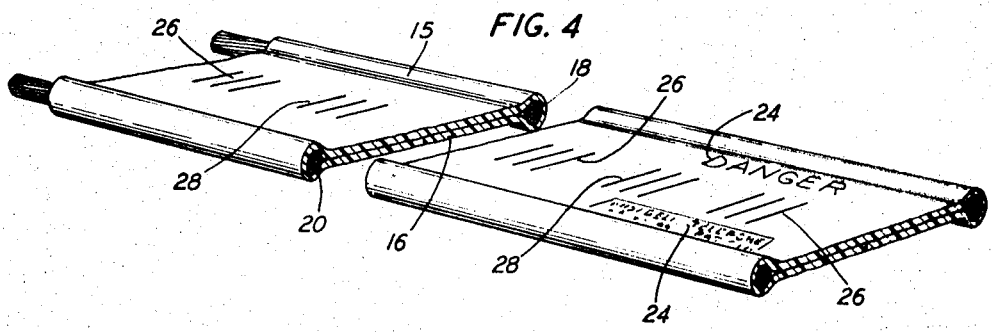
INVENTOR
H. SOUTHWORTH, JR.
BY Leo Stanger
ATTORNEY

IDENTIFYING MEANS FOR BURIED UTILITIES

BACKGROUND OF THE INVENTION

This invention relates to methods and means for locating and identifying buried cables or other utilities.

Buried utility lines such as electric lines, gas lines or water lines once buried in the ground are often difficult to locate for servicing. While maps of their location are often drawn, they may be inaccurate and are not always available to servicemen engaged in repair or maintenance. For example, men servicing gas utility lines may not have available to them the layout of nearby buried telephone lines. Thus, during excavation they may accidentally damage these unidentified telephone lines. With the recent efforts to beautify the countryside by digging trenches and burying such utilities, the probabilities of such undesirable encounters increase. Excavators grading sites for homes may also accidentally strike previously buried utility lines.

In the past, attempts have been made to identify the location of buried utilities either by coloring the soil above the buried utilities or by laying readily frangible tapes above the utilities or by along their lengths. It was hoped that the contrasting color of such colored soils or tapes would notify excavators of the existence below them of buried utilities. However, the excavating machinery is normally automatic and an operator has little opportunity to study the character of the soil during excavation. The bits of tape or soil which the excavating equipment scoops up are generally mixed in with the soil in such manner as virtually to be unnoticeable.

THE INVENTION

According to a feature of the invention the deficiencies of previously used identifying systems are obviated by burying over lengths of buried utilities such as power lines, telephone cables or gas lines, a length of longitudinally infrangible means with strengths sufficient to be substantially infrangible across the length thereof in a normal encounter with excavating equipment. The infrangible means thus forms an identifying means. Preferably where the infrangible means are very long they are also sufficiently stretchable so as to yield elastically to the equipment and allow the equipment to lift a significant portion high enough to be seen by an excavating-equipment operator.

However, according to another feature of the invention the identifying means are formed of a plurality of such longitudinally infrangible means each individually strong enough to be substantially infrangible across the length thereof in an encounter with excavating equipment, and each short enough so that in an encounter with the excavating equipment the latter pulls up an integral portion of the infrangible means with the soil. Preferably, the longitudinally infrangible means are stretchable, flexible and short enough to have one end drawn out of the earth but long enough to be readily visible when drawn out of the earth.

According to still another feature of the invention the infrangible means are composed of broad brightly-colored reinforced strips and preferably extending in overlapping lengths in the soil above and along the utility lines. The reinforcing may, for example, be nylon, fiberglass or steel.

By virtue of these features an operator of excavating equipment encounters the infrangible means before encountering the utility lines. As his equipment meets the infrangible means it draws them out of the soil. Preferably by being embedded in the soil the infrangible means impede the equipment to alert the operator to the existence of some unusual effect in the earth. As a result, he can observe his trench for visual indications. As the equipment lifts the infrangible means out over the ground they are large enough to be easily noticed. In order to indicate the character of the utility being protected in this manner, the infrangible means may contain legends applied thereon which describe the utility line.

According to another feature of the invention, coding means of a magnetic or radioactive type are applied to the infrangible means before burial. The operator of the excavating equipment, once he discovers the existence of the utility, can then follow its path above ground with suitable sensors.

These and other features of the invention are pointed out in the claims. Other objects and advantages of the invention will become known from the following detailed description when read in light of the accompanying drawings.

BRIEF DESCRIPTION OF THE DRAWINGS

FIG. 1 is an elevation of a subsoil section illustrating a utility line, with means for identifying it according to features of the invention;

FIG. 2 is a section 2-2 of FIG. 1;

FIG. 3 is a section 3-3 of FIG. 1;

FIG. 4 is a partly-sectional perspective view of an assembly used in FIGS. 1, 2 and 3 according to features of the invention;

DETAILED DESCRIPTION

Figure 5:
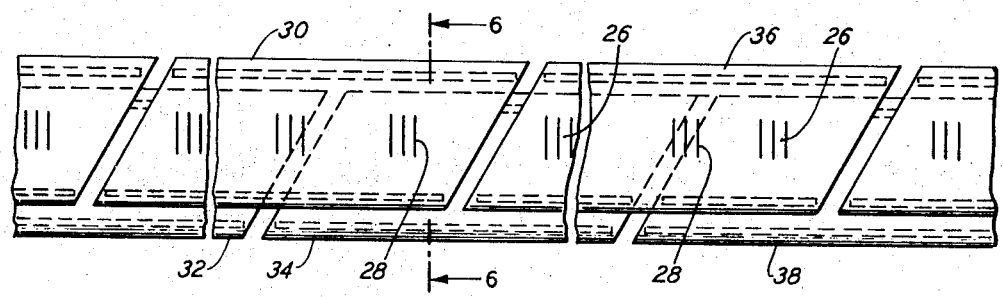
FIG. 5 is an elevation of an assembly for use in the arrangement of FIG. 1 according to another feature of the invention.

In FIGS. 1, 2 and 3, a utility line 10, such as an electric power cable, telephone cable, gas line, sewer pipe, or water line, is buried in soil 12 at a depth suitable for its usual purpose. The line 10 may follow a regular or irregular path, as shown in FIG. 2. Two indicator assemblies 14 are buried at two levels above the utility line 10 and below the surface of the soil. The indicator assembly 14 follows the path of the utility line 10 directly above the utility line as is more easily noted in FIG. 2. The levels of the assemblies 14 are those at which they are most likely to be encountered by excavating equipment operating near the line 10.

In accordance with one embodiment of the invention the indicating ends of the assemblies 14 of FIGS. 1, 2 and 3 are composed of a ribbon 15 shown in FIG. 4. Here, an elongated a extensible vinyl sheet 16 is folded about two nylon cords 18 and 20 of approximately one-quarter inch in diameter. The vinyl may, for example, be polyethylene and have the ability to stretch to up to eight times its length before breaking. The nylon cords are preferably stretchable up to three or four times their length. Such materials are described in the "The Handbook of Chemistry and Physics," 41st Edition, Published by Chemical Rubber Publishing Co. of Cleveland, Ohio. The cords 18 and 20 fit into the longitudinal folds in the sheet 16 so as to form elongated ridges at the edges of the ribbon 15. A suitable adhesive on one face of the sheet material 16 secures the cords 18 and 20 in place and holds the edges of the sheet 16 against the central portion of the sheet 16 so as to form the substantially unitary assembly of FIG. 4.

When the ribbon 15 constitutes the assembly 14 and is buried above utility line 10, an operator of automatic excavating equipment, a plow, or a laborer with a shovel, upon hitting the ribbon 15, starts to bring it up with his implement. In doing so, he can notice the resistance afforded by the ribbon. The latter, in response to the effort of the implement, yields elastically so that a portion of it becomes visible above the portion of the soil being dug. A suitable legend 24 on the surface of the ribbon then apprises the operator of the existence of the utility.

The legend 24 in FIG. 4 also includes an indication that the ribbon 15 has applied thereto magnetic coding signals 26 and radioactive coding signals 28. It instructs the operator that the path of the utility line may be followed by sensing the successive coding signals along its path with suitable sensing equipment above ground.

Figure 6:
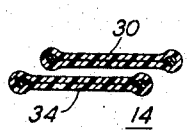
FIG. 6 is a section 6-6 of FIG. 5.

According to another feature of the invention the ease with which the ribbon is lifted from the earth is increased without, however, decreasing the recognizability of the ribbon or decreasing the size of ribbon lifted to the point where it becomes insignificant. This is done as in FIGS. 5 and 6. Here, a first length 30 of ribbon 15 longitudinally overlaps half of a length 32 of a ribbon 15 and half of a length 34 of a ribbon 15. The lengths 30, 32 and 34 of ribbons 15 are substantially in contact with one another and buried within the same trench. A ribbon length 36 overlaps the other half of the ribbon 34 and one-half of a ribbon length 38. The overlying pattern of ribbon lengths is arranged in FIG. 1 to form the assembly 14.

Figure 7:
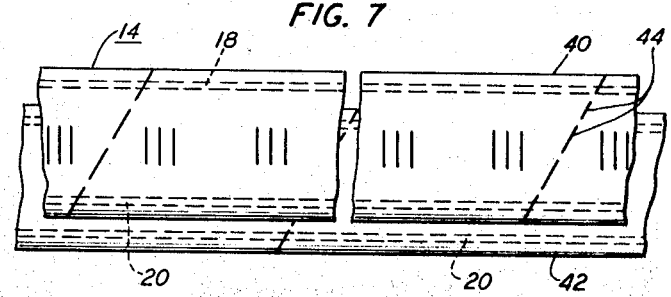
FIGS. 7, 8 and 9 are elevations of other assemblies for use in the arrangement of FIG. 1 wherein they embody features of the invention.

FIG. 7 illustrates another manner in which the assembly 14 may be embodied according to the invention. Here, the ribbon assembly 14 is composed of two long unbroken lengths 40 and 42 of ribbon 15. The cross section of the assembly is that shown in FIG. 6. However, in FIG. 7, perforations 44 allow the ribbons to be broken into substantially infrangible lengths 2 to 20 feet in length. The perforations on the respective ribbons alternate so that the perforations on one ribbon occur approximately at the midpoint between the perforations of the other ribbon.

In this manner when an excavating instrument encounters the assembly 14 of FIG. 7 it draws the ribbons 15 upwardly until they stretch and ultimately break at the perforations. This allows the newly broken ribbon to be more easily lifted with the soil to a visible location. At all times with all these embodiments, the ribbon 15 remains sufficiently intact over a large enough area so that the excavating operator sees not merely small bits of soil or plastic but large broad lengths of ribbon. The ribbon shown for FIGS. 4, 5, 6 and 7 is approximately 6 inches wide. However, widths such as from 2 to 24 inches are contemplated. The widths need not be the same throughout but may vary.

Figure 8:
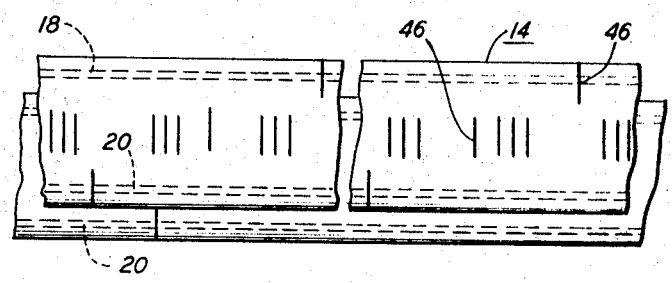

The assembly of FIG. 8 differs from that of FIG. 7 only in the perforations 46 which are here transverse to the longitudinal direction of the assembly but longitudinally offset. This causes the ribbon to hold longer before parting. The ribbon 15 thus exerts a force on the instrument which force constitutes a tactile indication to the operator of its existence in the soil.

That the lengths of ribbon in FIGS. 5, 6, 7 and 8 are longitudinally overlaid assures that wherever the excavating instrument encounters the assembly 14 it is close enough to the center of one length to draw out a substantial portion thereof it not all of it.

In all the embodiments shown all the lengths of ribbon carry both magnetic and radioactive guide markings 26 and 28.

Figure 9:
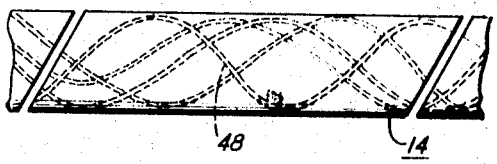

The ribbons 15, instead of having the nylon cords 18 and 20 sandwiched only at the edges, may have similar cords 48 sandwiched throughout the ribbon width as shown in FIG. 9. These may be in a regular or random pattern. The cords may also constitute fiberglass or steel strands. The ribbon appears in FIG. 10 as composed of separated sections.

Figure 10:
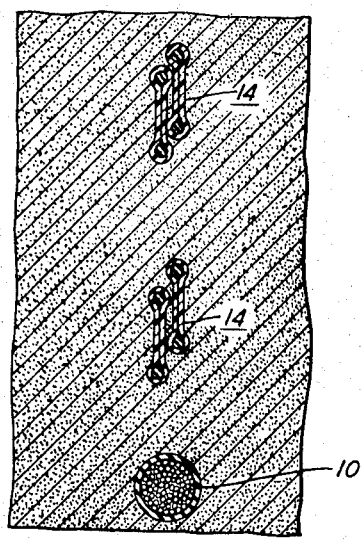
FIG. 10 is a sectional view of a subsoil portion carrying a utility line and assemblies corresponding to FIGS. 5, 6, and 7 and arranged to embody features of the invention.

According to another feature of the invention, the assemblies 14 whether composed of a single ribbon 15 or the ribbon pattern of ribbon lengths 30, 32, 34, 36 and 38, instead of lying horizontally flat, are arranged edge upwards in both locations and both levels of the assembly 14 as shown in FIG. 10. They may also be arranged so that one assembly 14 is horizontal at one level and the other assembly 14 is edge upwards. When an operator with his excavating equipment now encounters the ribbons shown in FIG. 3, 4, 5, 6, 7, 8, 9 and 10, his equipment draws the ribbons upwardly. By virtue of the strength imparted by the cords 18 or cords 48, the ribbons do not break. However, they first e begin to stretch and then become unseated from their buried positions. As the equipment draws them out further, they slip out of their buried positions and appear above the soil where an operator can observe them.

The assemblies 14 are installed after or while laying the utility line as the earth is filled back into the trench which contains the utility line. If a a cable laying plow lays the utility line it can simultaneously lay the assemblies 14 with it. Otherwise, when approximately two or three feet of the earth have been filled a back, one ribbon assembly 14 shown in FIGS. 4, 5, 6, 7, 8, 9 or 10 is laid and the trench further backfilled. When the trench is filled within 1 or 2 feet of the surface, o another ribbon assembly corresponding to that shown in FIGS. 3, 4, 5, 6, 7, 8, 9 or 10 is put in place and the remainder of the earth backfilled.

By virtue of the invention, an operator digging a trench either with mechanical excavating equipment or with a simple shovel is apprised of the existence of the utility line before he reaches the line and before damage results. By means of a radioactive or magnetic sensor he may then follow the line along its path and take steps to avoid damage. Service with such utility lines is, therefore, more reliably maintained.

While embodiments of the invention have been described in detail, it will be obvious to those skilled in the art that the invention may be practiced otherwise or embodied otherwise, without department from its spirit and scope.

I claim:

1. An assembly comprising an area of soil, an element of construction buried in said area of soil, longitudinal identifying means buried in said area of soil above said element of construction but spaced therefrom, said identifying means including a length of longitudinally infrangible means having strength sufficient to be substantially infrangible across the length when encountered by excavating equipment, said infrangible means including material having a color contrasting with that of the earth whereby to facilitate the location of said element of construction, said infrangible means including a pair of nylon cords and stretchable plastic means encasing said nylon cords, said stretchable plastic means being of a color contrasting with the soil.

2. An assembly as in claim 1 wherein said infrangible means includes plastic ribbon means folded about said nylon cords to form an elongated strip with the encased nylon cords at the edges thereof.

3. An assembly as in claim 2 wherein said infrangible means are edge upright.

Dedication 3,568,626.—*Hamilton Southworth, Jr.*, New York, N.Y. IDENTIFYING MEANS FOR BURIED UTILITIES. Patent dated Mar. 9, 1971. Dedication filed July 7, 1972, by the assignee, *Bell Telephone Laboratories, Incorporated.*

Hereby dedicates to the Public the remaining term of said patent.

[*Official Gazette September 19, 1972.*]